Sept. 30, 1947.  E. P. ANSTETT  2,428,259
NAIL

Filed Nov. 15, 1943

Inventor
Edgar P. Anstett
By Morris Spector,
Atty

Patented Sept. 30, 1947

2,428,259

UNITED STATES PATENT OFFICE 2,428,259

NAIL

Edgar P. Anstett, Chicago, Ill., assignor of twenty per cent to Carl J. Anstett and twenty-five per cent to Dolly Anstett, both of Chicago, Ill.

Application November 15, 1943, Serial No. 510,417

2 Claims. (Cl. 85—21)

This invention relates to nails in general and more particularly to nails of the type that may be used in automatic nailing or stapling machines.

It is one of the objects of the present invention to provide a nail which performs the usual nail holding functions and which is of such cross sectional shape as to particularly lend itself for use in a nailing machine wherein the nails are progressively fed into position, one at a time, as each preceding nail is hammered home.

It is a still further object of the present invention to provide a nail which may be made out of sheet stock by a simple punching operation.

It is a still further object of the present invention to provide a nail which is made of sheet material and wherein the head lies in the same plane as the plane of the shank of the nail so that a series of such nails may be superposed upon one another for successive feeding in a nailing machine.

It is a still further object of the present invention to provide an assembly of nails consisting of a large number of nails stacked in a row, one upon the other, and held together by a very thin layer of an adherent, so that the entire stack of nails can be picked up and handled as a unit for positioning in a nailing machine.

It is a still further object of the present invention to provide a nail the shank of which is of rectangular cross section, the opposite surfaces of which are flat so that they may lie against the flat surfaces of adjacent nails in a nailing machine, and the other two opposite surfaces of the nail are provided with burrs for facilitating anchoring of the nail in the wood into which it may be driven.

It is a still further object of the present invention to provide a nail which is substantially rectangular in cross section and wherein one set of opposite sides are provided with burrs and the other set of opposite sides are provided with grooves, both the burrs and the grooves facilitating anchoring the nail in the surface into which it is driven.

It is a still further object of the present invention to provide a nail of the above mentioned character wherein the grooves of contacting faces of adjacent nails are staggered with respect to one another. This is of importance if the nails are held together by a thin frangible film of glue or other cementitious material to form a "stick" of nails for insertion into the nailing machine. In such a machine the individual nails are severed from the "stick" one at a time by a plunger rod that shifts the last nail of the "stick" lengthwise with respect to the adjacent nail. In such an arrangement if the grooves on contacting faces of the nail are opposite one another the grooves may become filled with a bead of the glue that adheres adjacent nails together and then it would become necessary to shear the bead of glue thus formed when it is desired to sever the nail from the "stick" of nails. By the present invention the grooves are not opposite one another and therefore no interlocking bead of glue can be formed between two adjacent nails, so that it is therefore not necessary to shear an interlocking bead before a nail can be severed from the "stick."

The attainment of the above and further objects of the present invention will be apparent from the following specification taken in conjunction with the accompanying drawing forming a part thereof.

Figure 1:
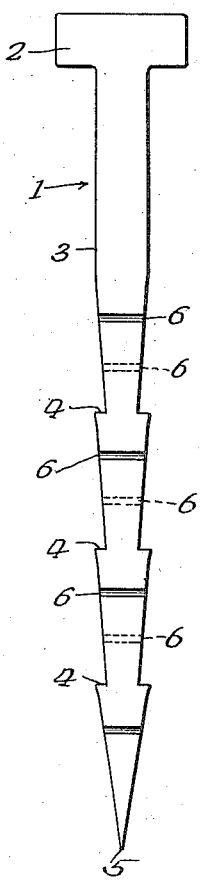
Figure 1 is an enlarged side view of a nail embodying the present invention.
Figure 2:
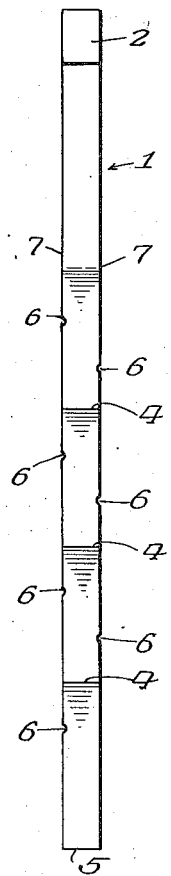
Figure 2 is an enlarged side veiw of the same nail, said view being taken at right angles to Figure 1.

Reference may now be had more particularly to Figures 1 and 2 illustrating the construction of a nail embodying the present invention. These are substantially enlarged for illustrative purposes. The nail of Figure 1 may be stamped out of a sheet of low carbon steel or spring steel of a hardness of 45° Rockwell. The nail includes a head 2 and a shank 3. The nail is T-shaped in cross section when viewed lengthwise from one side thereof and is rectangular in cross section when viewed lengthwise from the opposite side thereof, as may be seen from Figures 1 and 2. A number of burrs 4—4—4 are formed on opposite sides of the shank 3. Between adjacent burrs 4—4 that are spaced lengthwise of the nail the shank is slightly tapered, as may be seen from Figure 1. The bottom of the nail is tapered to a knife edge, as indicated at 5. In view of the fact that the nail is stamped from a sheet of metal it will be of rectangular cross section. The burrs 4 are formed across the thickness of the sheet from which the nail is stamped, thus being formed on two opposite sides of the nail as the nail is sheared from the sheet in the stamping operation. The other two opposite sides of the nail have grooves 6—6 formed therein. The grooves 6—6 on opposite sides of the nail are staggered with respect to one another and are staggered with respect to the burrs 4—4. Because there are no bending operations performed on the metal in the fabrication of the nail, the metal used may be and is substantially harder than the usual bent metal or wire nails.

In order to comprehend the sizes of the burrs 4 and the groove 6 it may be well to mention the size of the nail illustrated in Figures 1 and 2, although it is understood that the nail may be made of vastly different sizes and proportions, if desired. The nail of Figure 1 is stamped from sheet steel of a thickness of .050 inch. The nail is one inch long from the bottom of the knife edge to the top surface of the head of the nail. The shank of the nail is 1/16 inch wide and .050 inch thick. The head 2 is 1/16 inch high and 3/32 inch across as viewed in Figure 1. The burrs 4 are each of a depth of .01 inch and they are spaced apart lengthwise of the nail .156 inch. The grooves 6 are each of a depth of .003 inch.

Figure 3:
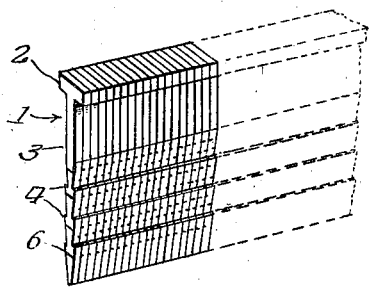
Figure 3 is a perspective view of a stack of nails embodying the present invention and forming a "stick" for insertion into a nailing machine.

Nails of the type illustrated in Figures 1 and 2 are stacked together one upon the other, as illustrated in Figure 3, and are held together to form a "stick" by coating the same with a thin layer of glue that forms a thin frangible film holding the nails together. The "stick" may then be inserted into a nailing machine where each time the end nail is severed from the "stick" the rest of the "stick" is advanced in position in the machine to bring the next nail into nailing position, in a manner known in the art. The grooved surfaces 7—7 of the adjacent nails are in contact with one another. It is to be noted that the groove 6 on one nail is not opposite the groove 6 on an adjacent nail. This is for a definite reason. If the grooves are opposite one another then the two grooves on adjacent nails would form a cavity for receiving a drop of glue that, upon hardening, would form a bead that would have to be sheared as each nail is severed from the "stick." This would interfere with the successive separations of the nails from the "stick" during the nailing operation. Furthermore, in view of the fact that each groove 6 is very small, capillary action prevents the glue, or any appreciable amount of glue, from entering the groove. If, however, there were two grooves opposite one another much more than twice as much glue would enter, since the capillary restriction to the flow of glue into the grooves 6 would be substantially reduced.

In compliance with the requirements of the patent statutes I have here shown and described a preferred embodiment of my invention. It is, however, to be understood that the invention is not limited to the precise construction here shown, the same being merely illustrative of the principles of the invention.

What I consider new and desire to secure by Letters Patent is:

1. A nail comprising a sheet metal member of uniform thickness thoughout so that it may be stacked with other nails identical therewith to form a stick of nails for insertion into a nailing machine, said nail including a shank having burrs formed on two opposite sides thereof, the other two opposite sides being flat and each having crosswise extending grooves formed therein.

2. A nail comprising a sheet metal stamping of uniform thickness throughout so that it may be stacked with other nails identical therewith to form a stick of nails for insertion into a nailing machine, said nail including a shank of rectangular cross section and having burrs formed on two opposite sides thereof and having crosswise extending grooves formed in the other two opposite sides, the grooves in the opposite sides being staggered with respect to each other and with respect to the burrs.

EDGAR P. ANSTETT.

REFERENCES CITED

The following references are of record in the file of this patent:

UNITED STATES PATENTS

| Number | Name | Date |
|---|---|---|
| 1,989,769 | Obstfeld | Feb. 5, 1935 |
| 2,122,814 | Hansen | July 5, 1938 |
| 2,294,463 | Krantz | Sept. 1, 1942 |
| 1,425,470 | Glardon | Aug. 8, 1922 |
| 1,077,583 | Baxter | Nov. 4, 1913 |
| 1,069,442 | Lazear | Aug. 5, 1913 |
| 165,470 | Blake | July 13, 1875 |
| 1,717,479 | Wakeman | June 18, 1929 |

FOREIGN PATENTS

| Number | Country | Date |
|---|---|---|
| 759,613 | France | Nov. 23, 1933 |
| 274,547 | Great Britain | July 18, 1927 |
| 378,732 | France | Oct. 15, 1907 |
| 7,489 | Great Britain | Apr. 12, 1895 |